United States Patent [19]
Dittmar et al.

[11] 3,767,994
[45] Oct. 23, 1973

[54] CIRCUIT ARRANGEMENT FOR RAPID CHARGING OF STORAGE BATTERIES

[75] Inventors: Wilfried Dittmar, Fischbach; Jurgen Lambrette; Hermann Schatz, both of Kelkheim, all of Germany

[73] Assignee: Varta Aktiengesellschaft, Frankfurt am Main, Germany

[22] Filed: Apr. 3, 1972

[21] Appl. No.: 240,622

[52] U.S. Cl. .................. 320/20, 320/39, 320/DIG. 2
[51] Int. Cl. ............................................. H02j 7/14
[58] Field of Search .................. 320/20, 21, 39, 40, 320/DIG. 2; 323/22

[56] References Cited
UNITED STATES PATENTS

| | | | |
|---|---|---|---|
| 3,531,706 | 9/1970 | Mullersman | 320/39 X |
| 3,310,724 | 3/1967 | Grafham | 320/DIG. 2 |
| 3,597,673 | 8/1971 | Burkett et al. | 320/20 X |
| 3,409,802 | 11/1968 | Savage | 320/40 X |

*Primary Examiner*—J. D. Miller
*Assistant Examiner*—Robert J. Hickey
*Attorney*—Arthur E. Wilfond et al.

[57] ABSTRACT

A circuit arrangement for the rapid charging of a storage battery having a positive polarity terminal and a negative polarity terminal with a pulsating current and with a discharge circuit has a power input and at least one switch connected between the power input and the storage battery. A discriminator element is connected to the storage battery for sensing the voltage of the storage battery during the pauses in the current flow and for controlling the switch via the discriminator element. The discriminator element is connected across the storage battery. The discriminator element comprises first and second transistors each having emitter, collector and base electrodes. The base electrode of the first transistor is connected to the collector electrode of the second transistor. The emitter electrode of the first transistor is connected to the base electrode of the second transistor. A first resistor is connected in series circuit arrangement with a potentiometer between the emitter electrode of the second transistor and the negative polarity terminal of the storage battery. At least one circuit is connected between the first resistor and the input side of the switch and includes a first diode and a second resistor.

12 Claims, 5 Drawing Figures

CIRCUIT ARRANGEMENT FOR RAPID CHARGING OF STORAGE BATTERIES

DESCRIPTION OF THE INVENTION

The present invention relates to the rapid charging of storage batteries. More particularly, the invention relates to a circuit arrangement for the rapid charging of storage batteries.

The circuit arrangement of the invention charges storage batteries with a pulsating current and possibly with a discharge circuit. At least one switch is connected between the transformer or a rectifier connected to it and the storage battery. The switch is controlled via a discriminator element which senses the voltage of the storage battery in the pauses of the current flow.

In normal constant voltage charging equipment with an AC input, in which control devices are connected directly to the battery to be charged, the input voltage, and consequently the charging time, may vary within wide limits in accordance with the resistance of the storage battery, since said resistance has a considerable influence on the voltage which develops at the storage battery during each charging current pulse.

This difficulty occurs mainly with low maintenance, gastight or semi-gastight lead storage batteries which operate with a limited supply of electrolyte and have an internal resistance which is several times as large as that of a standard storage battery. In addition, the internal resistance depends upon the temperature and can vary considerably from one battery to another, corresponding to the amount of electrolyte in the individual cells. In the case of a lead storage battery, the internal resistance depends upon the degree of sulfatization of the plates.

It is known that gastight storage batteries such as, for example, nickel cadmium cells, can be charged to their full capacity in a short time if measures are taken to prevent the cell voltage from exceeding a definite limit value during brief interruptions of the charging current or during a current pause. The temperature should also rise only slightly during charging.

In order to be able to charge storage batteries in a short time with only a slight increase in temperature and to obtain a reliable indication of the state of charge of the battery that depends only little on the internal resistance, it has been found to be advantageous to use as the charging current a current obtained by half wave or bridge rectification without smoothing. During alternating half waves or during the intervals between the instant at which the instantaneous voltage drops below the battery voltage and the instant at which it again exceeds the battery voltage, no charging current flows. During these intervals, the voltage at the storage battery corresponds to a residual polarization which follows the preceding charging current pulse and can be used as an indication of the state of the charge of the storage battery.

In the rapid charging circuits, the charging current is controlled by an electronic switch such as, for example, a transistor or silicon controlled rectifier. The charging current is reduced or terminated, for example, according to the German Published Pat. application No. 1,937,282, by connecting a circuit in shunt with the storage battery. The circuit includes a capacitor and a preferably electronic switch via which the capacitor is connected parallel to the storage battery during the pauses in the charging current. The capacitor is connected to a voltage sensitive circuit arrangement via which the transistor or the silicon controlled rectifier is cut off as soon as the capacitor reaches a predetermined voltage. In this German Published Pat. application, the voltage across the capacitor is compared with a reference voltage which is provided by a Zener diode.

The disadvantage of such a circuit arrangement is the high expenditure for components, since a comparator is required for the comparison between the reference and the actual value.

In order to shorten the charging time and to reduce the gas development and the temperature of the storage battery, it has been proposed to insert a discharge pulse between two charging current pulses. Thus, Russian Pat. No. 180,224 discloses a method for the rapid charging of lead-acid storage batteries in which the plates of the batteries are poled at certain intervals in such a manner that they serve as the anode one time and as the cathode another time. In order to achieve this, an asymmetrical alternating AC voltage is applied to the plates. The Russian patent discloses a definite ratio for the amplitude of the currents (charging current and discharging current) and for the duration of the two current pulses.

Furthermore, German Published Pat. application No. 1,935,201 discloses a device for the rapid charging of batteries which makes it possible to connect a discharge path within the time interval between two DC pulses fed successively to the battery. In this device, a Zener diode is also used as the voltage standard.

An object of the present invention is to provide a circuit arrangement for the rapid charging of storage batteries with a pulsating current and possibly with a discharge circuit, which avoids the shortcomings of the Zener diodes used in the known devices as the discriminator elements and which can be used for charging storage batteries with different terminal voltages by the simple operation of a potentiometer.

In accordance with the invention, the discriminator element connected parallel to the storage battery comprises two transistors. The base electrode and the emitter electrode of the first transistor are connected, respectively, to the collector electrode and the base electrode of the second transistor. The emitter electrode of the second transistor is connected via a series circuit arrangement of a potentiometer and a resistor to the negative polarity terminal of the storage battery. A circuit comprising at lease one diode and one resistor is connected between the resistor and the line voltage side of the switch.

In order that the invention may be readily carried into effect, it will now be described with reference to the accompanying drawings, wherein.

In the figures, the same components are identified by the same reference numerals.

Figure 1:
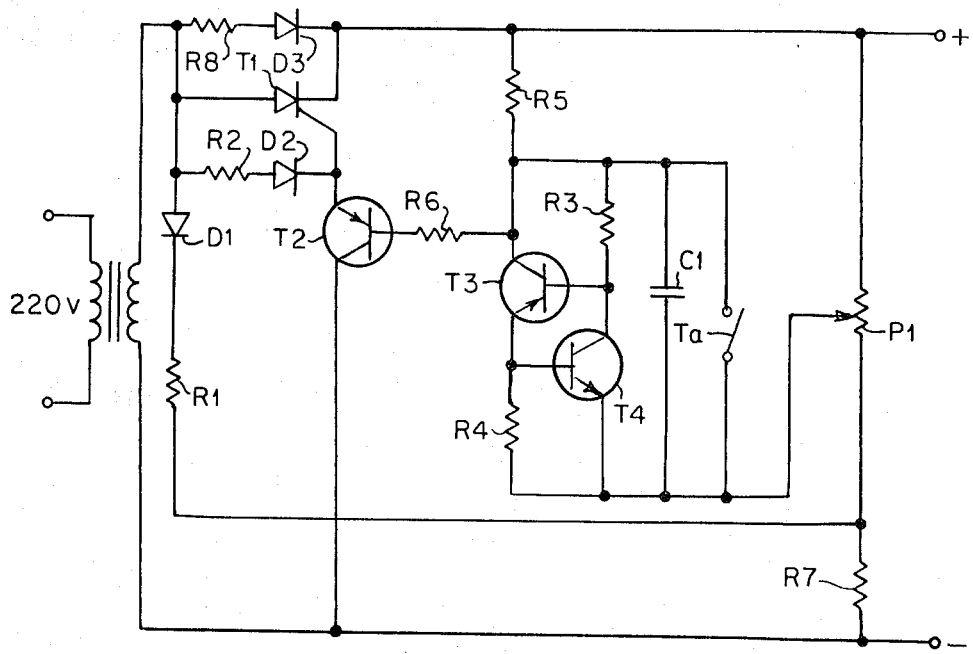
FIG. 1 is a circuit diagram of an embodiment of the circuit arrangement of the invention for the rapid charging of storage batteries by a pulsating current which is obtained by half wave rectification.
Figure 2:
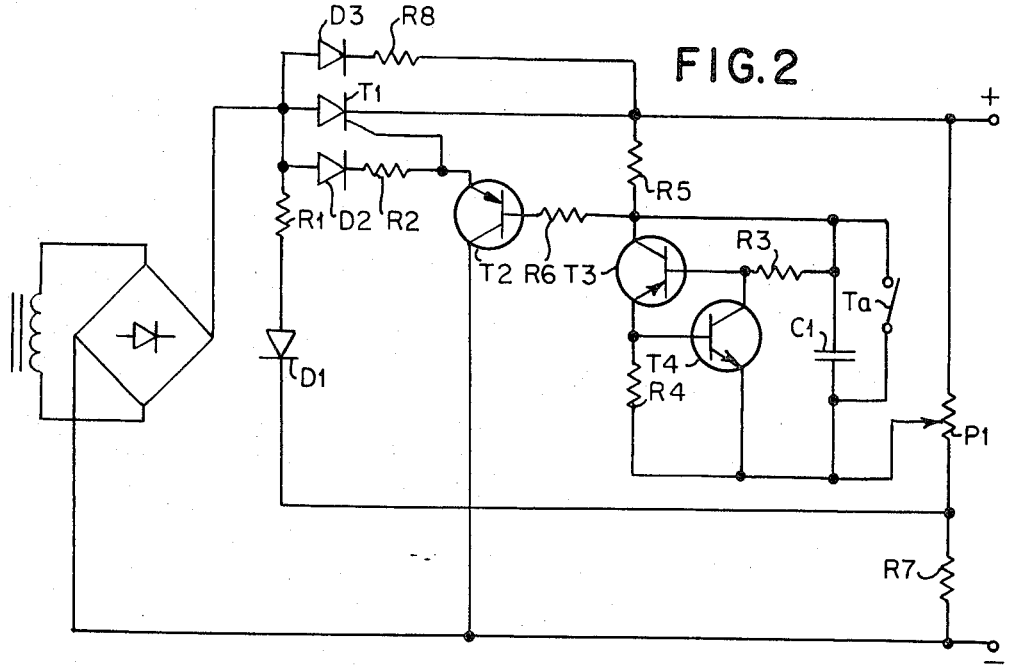
FIG. 2 is a circuit diagram of the embodiment of FIG. 1 of the circuit arrangement of the invention with a preceding bridge.

In FIG. 1, the transformed AC line voltage is fed to the battery as a half wave current via an electronic switch, which is preferably a silicon controlled rectifier T1, which is fired at the beginning of each positive half wave. Depending on the desired utilization of the transformer, other combinations of rectification such as, for example, an uncontrolled bridge in conjunction with a controlled silicon rectifier, a semicontrolled bridge, center tap circuit with silicon controlled rectifiers may be used according to FIGS. 2, 3 and 4.

The discriminator element proper, which senses the voltage of the battery, comprises transistors T3 and T4 and is connected across or in shunt with the storage battery. The base electrode of the transistor T3, which is operated in the inverted mode, is connected to the collector electrode of the transistor T4 and the emitter electrode of the transistor T3 is connected to the base electrode of the transistor T4. The emitter electrode of the transistor T4 is connected to the negative polarity terminal of the storage battery via the tap of a potentiometer P1 and a resistor R7. A common point in the connection between the potentiometer P1 and the resistor R7 is connected via a series circuit arrangement of a resistor R1 and a diode D1 to the line voltage side of the switch T1 or to the anode of the silicon controlled rectifier comprising the switch T1.

At the start of each half wave as soon as the instantaneous value of the transformed line voltage has exceeded the voltage of the storage battery, the silicon controlled rectifier T1 is ignited or fired. A control signal is fed to the control electrode of the silicon controlled rectifier T1 via a series circuit comprising a diode D2 and a resistor R2. At the same time, the half wave voltage at the resistor R7 is applied via the resistor R1 and the diode D1. The resistor R7 is designed so that the voltage at the discriminator element is below the breakdown voltage of the base-emitter path of the transistor T3 and the discriminator element is cut off. Thereby, however, the base electrode of the transistor T2, which is connected to the collector electrode of the transistor T3, is at about the potential of the emitter electrode and the transistor T2 is also cut off. At the end of each half wave, the current decreases below the sustaining current of the silicon controlled rectifier T1 and said silicon controlled rectifier is cut off. The voltage across the storage battery then corresponds to a residual polarity following the charging current pulse, which can be used as an indication of the charge state of the storage battery and which only depends a little on the internal resistance of the storage battery.

As the instantaneous magnitude of the half wave voltage decreases, the potential at the emitter electrode of the transistor T4 shifts in the negative direction. The voltage at the discriminator element increases and after the switch T1 is cut off, said voltage is only a function of the battery voltage or a fraction of the battery voltage adjustable at the potentiometer P1. The discriminator element can therefore become active only during the current pauses and this only if the partial voltage of the battery voltage applied to it exceeds the cut-off voltage of the base-emitter path of the transistor T3. The behavior of the discriminator element corresponds to the voltage-current characteristic of a four layer diode with low threshold voltage. As soon as the cut-off voltage of the base-emitter path of the transistor T3 is reached, a small current flows into the base electrode of the transistor T4 and makes the transistor T4 conductive.

The current through the transistor T4 causes a voltage drop at the resistor R3, whereby the transistor T3, whose collector electrode then takes on the role of the emitter electrode, is also driven all the way. The base current of the transistor T4 increases thereby and said transistor is driven further and in turn controls the transistor T3 upward. By this feedback, the discriminator element is driven suddenly. The transistor T2 is also driven into conduction and the control electrode of the silicon controlled rectifier T1 is connected to the negative polarity terminal of the storage battery. At such point, the charging process terminates, because for the next half wave, the silicon controlled rectifier T1 remains cut off, since no control signal is available at its control electrode.

A capacitor C1 is connected in parallel with the discriminator element, to prevent the charging from being affected by external influences, for example, by occasional voltage spikes. A pushbutton switch Ta is also connected in parallel with the discriminator element. The switch Ta permits the manual restarting of the rapid charging process.

The self-discharge of a storage battery continuously connected to the charging device may be compensated for by a series circuit arrangement of a diode D3 and a resistor R8 connected in parallel with the anode-cathode path of the silicon controlled rectifier T1.

Figure 3:
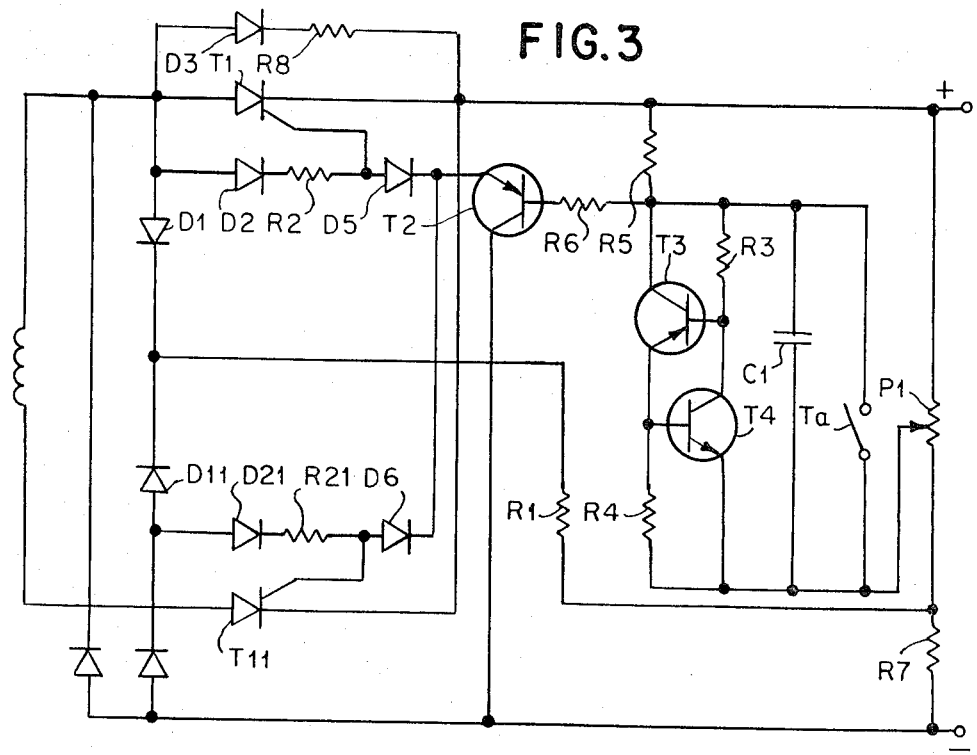
FIG. 3 is a circuit diagram of another embodiment of the circuit arrangement of the invention for the rapid charging of storage batteris in which the bridge is semi-controlled.
Figure 4:
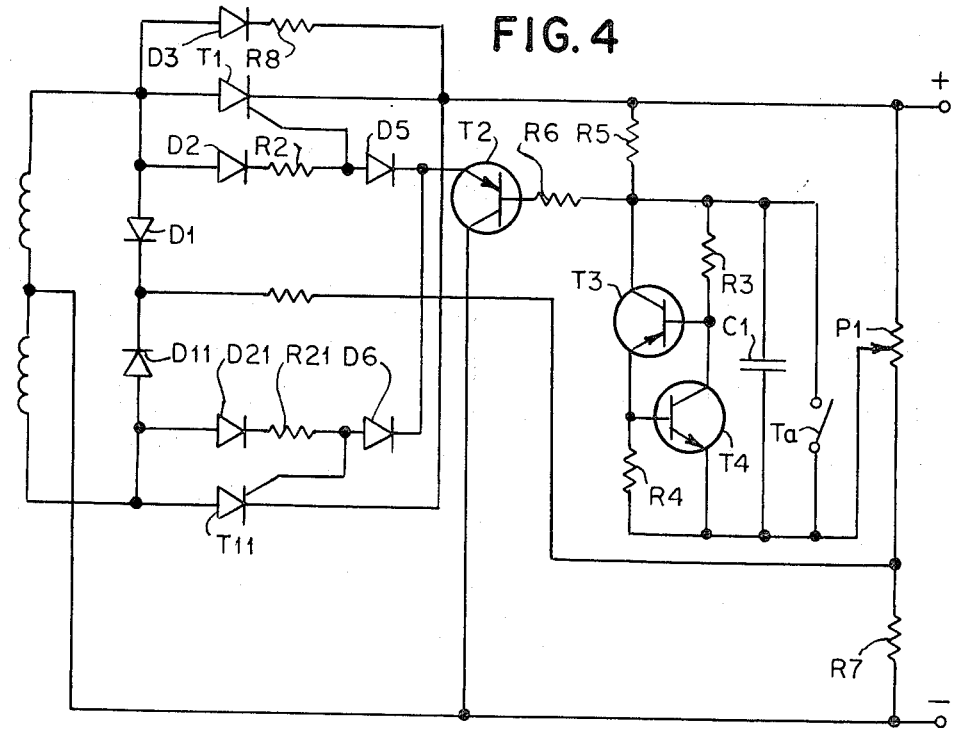
FIG. 4 is a circuit diagram of another embodiment of the circuit arrangement of the invention for the rapid charging of storage batteries with a pulsating current which is a center tap circuit arrangement.

If a semiconductor controlled switch or a center tap circuit, as shown in FIGS. 3 and 4, is used for rectification, the cathode of a silicon controlled rectifier T11 which is then used in addition, is connected, in accordance with the invention, to the cathode of the silicon controlled rectifier T1. The control electrodes of the silicon controlled rectifiers T1 and T11 are connected to the emitter electrode of the transistor T2 via diodes D5 and D6, respectively.

Figure 5:
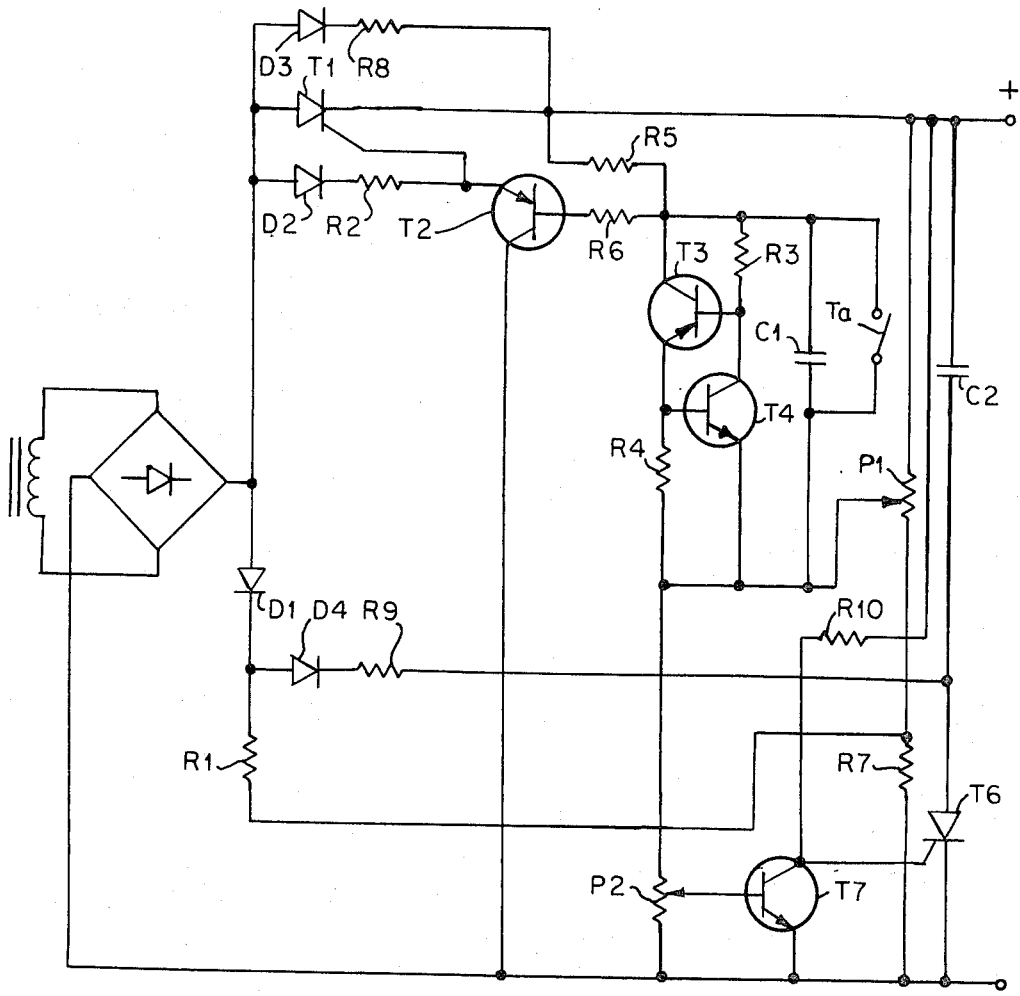
FIG. 5 is a circuit diagram of another embodiment of the circuit arrangement of the invention for the rapid charging of storage batteries with a pulsating current and a discharge circuit.

In the embodiment of FIG. 5, the circuit arrangement of the invention for the rapid charging of storage batteries with a pulsating current may be provided with an additional discharge circuit. The additional discharge circuit comprises a series circuit arrangement of a capacitor C2 and a silicon controlled rectifier T6 and is connected in parallel with the storage battery. The silicon controlled rectifier T6 may be driven via a transistor T7, which is connected in shunt with or across the storage battery. The anode of the silicon controlled rectifier T6 is connected via two diodes D1 and D4 and a resistor R9 to the line voltage side of the silicon controlled rectifier T1. The control electrode of the silicon controlled rectifier T6 is connected to the collector electrode of the transistor T7. The base electrode of the transistor T7 is connected to the tap of a potentiometer P2, which is connected between the emitter electrode of the transistor T4 and the negative polarity terminal of the storage battery.

At the start of a half wave, the transistor T7 is conducting, since a current flows through the potentiometers P1 and P2 and the voltage drop at the tap of the potentiometer P2 is sufficient due to the increased terminal voltage of the storage battery, to drive the transistor T7 fully into conduction. However, the control electrode of the silicon controlled rectifier T6 is thereby also connected to the cathode potential of said silicon controlled rectifier and said silicon controlled rectifier is cut off. The capacitor C2 is charged via the series circuit arrangement of the diodes D1 and D4 and the resistor R9. If at the end of a half wave, the silicon controlled rectifier T1 is cut off, the voltage at the potentiometers P1 and P2 drops to the value of the open circuit voltage of the storage battery.

If the open circuit voltage is not yet sufficient to drive the discriminator element into conduction, the voltage at the potentiometer P2 is no longer sufficient to keep the transistor T7 conducting. The transistor T7 cuts off and makes the silicon controlled rectifier T6 conductive. The capacitor C2 is then discharged or its charge reversed, respectively. An exponentially decaying current is derived from the storage battery until the current falls below the sustaining current of the silicon controlled rectifier and said silicon controlled rectifier cuts off suddenly.

If the battery has reached its rated capacity, the discriminator element makes a through connection during the current pause and the voltage drop at the potentiometer P2 is increased by the current additionally flowing in it, so that the transistor T7 remains conducting and the silicon controlled rectifier T6 continues to be cut off.

The advantages of the circuit arrangement of the invention for the rapid charging of storage batteries are particularly that the cost of components can be kept low and that a voltage standard or reference voltage is not necessary. Furthermore, the discriminator element has a temperature coefficient matched to the battery.

While the invention has been described by means of specific examples and in specific embodiments, it should not be limited thereto, for obvious modifications will occur to those skilled in the art without departing from the spirit and scope of the invention.

We claim:

1. A circuit arrangement for the rapid charging of a storage battery having a positive polarity terminal and a negative polarity terminal with a pulsating current and with a discharge circuit, having a power input, a potentiometer having a tap electrode, a first resistor connected in series with the potentiometer to the negative polarity terminal of the storage battery, and at least one switch connected between the power input and the storage battery and a discriminator element connected to the storage battery for sensing the voltage of the storage battery during the pauses in the current flow and for controlling said switch via said discriminator element, said discriminator element being connected between the tap electrode of the potentiometer and the positive polarity terminal of the storage battery and comprising first and second transistors each having emitter, collector and base electrodes, the base electrode of the first transistor being connected to the collector electrode of the second transistor, the emitter electrode of the first transistor being connected to the base electrode of the second transistor and the emitter electrode of the second transistor being connected to the tap electrode of the potentiometer, and at least one circuit connected between the first resistor and the input side of the switch, said circuit including a first diode and a second resistor.

2. A circuit arrangement as claimed in claim 1, wherein the switch is a silicon controlled rectifier.

3. A circuit arrangement as claimed in claim 2, further comprising a third transistor having emitter, collector and base electrodes, and wherein the silicon controlled rectifier has a control electrode connected to the emitter electrode of the third transistor, the base electrode of the third transistor being connected to the collector electrode of the first transistor of the discriminator element.

4. A circuit arrangement as claimed in claim 3, further comprising a second diode and a third resistor connected in series circuit arrangement with the second diode, and wherein the silicon controlled rectifier has an anode connected to the control electrode of the silicon controlled rectifier via said series circuit arrangement.

5. A circuit arrangement as claimed in claim 4, further comprising a first capacitor connected between the collector electrode of the first transistor and the emitter electrode of the second transistor.

6. A circuit arrangement as claimed in claim 5, further comprising a third diode and a fourth resistor connected in series circuit arrangement with the third diode, said series circuit arrangement being connected in parallel with the anode-cathode path of the silicon controlled rectifier.

7. A circuit arrangement as claimed in claim 6, further comprising a second switch connected between the power input and the positive polarity terminal of the storage battery.

8. A circuit arrangement as claimed in claim 7, wherein the second switch comprises a second silicon controlled rectifier having a control electrode connected to the emitter electrode of the third transistor.

9. A circuit arrangement as claimed in claim 8, wherein a discharge circuit is connected in parallel with the storage battery and comprises a second capacitor and a third silicon controlled rectifier connected in series circuit arrangement.

10. A circuit arrangement as claimed in claim 9, further comprising a fourth transistor having emitter, collector and base electrodes and a second potentiometer having a tap, and wherein the third silicon controlled rectifier has an anode-cathode path connected in parallel with the fourth transistor, and the base electrode of the fourth transistor is connected to the tap of the second potentiometer.

11. A circuit arrangement as claimed in claim 10, further comprising a fourth diode and a fifth resistor connected in series circuit arrangement with the fourth diode, and wherein the silicon controlled rectifier has an anode connected to the cathode of the first diode via said series circuit arrangement.

12. A circuit arrangement as claimed in claim 11, further comprising a pushbutton switch connected across the first capacitor.

* * * * *